United States Patent
Walsh et al.

(10) Patent No.: US 8,600,025 B2
(45) Date of Patent: Dec. 3, 2013

(54) SYSTEM AND METHOD FOR MERGING VOICE CALLS BASED ON TOPICS

(75) Inventors: Richard J. Walsh, Raleigh, NC (US); Alfredo C. Issa, Apex, NC (US)

(73) Assignee: Oto Technologies, LLC, Raleigh, NC (US)

( * ) Notice: Subject to any disclaimer, the term of this patent is extended or adjusted under 35 U.S.C. 154(b) by 752 days.

(21) Appl. No.: 12/644,246

(22) Filed: Dec. 22, 2009

(65) Prior Publication Data

US 2011/0150198 A1 Jun. 23, 2011

(51) Int. Cl.
*H04M 3/42* (2006.01)

(52) U.S. Cl.
USPC ........................ 379/202.01; 379/158

(58) Field of Classification Search
USPC ............. 379/202.01, 158, 201.01, 207.01
See application file for complete search history.

(56) References Cited

U.S. PATENT DOCUMENTS

| | | | |
|---|---|---|---|
| 5,491,835 A * | 2/1996 | Sasuta et al. .................. 455/509 |
| 5,596,634 A * | 1/1997 | Fernandez et al. ........ 379/210.01 |
| 5,721,763 A * | 2/1998 | Joseph et al. .............. 379/88.04 |
| 6,088,435 A * | 7/2000 | Barber et al. ............ 379/205.01 |
| 6,151,571 A | 11/2000 | Pertrushin |
| 6,411,683 B1 * | 6/2002 | Goldberg et al. .......... 379/88.01 |
| 6,501,740 B1 * | 12/2002 | Sun et al. ...................... 370/261 |
| 6,629,069 B1 * | 9/2003 | Attwater et al. ............. 704/231 |
| 6,839,417 B2 * | 1/2005 | Weisman et al. ........ 379/204.01 |
| 6,977,993 B2 | 12/2005 | Starbuck et al. |
| 7,120,668 B2 * | 10/2006 | Manber et al. ................ 709/205 |
| 7,155,207 B2 | 12/2006 | Chapman et al. |
| 7,248,677 B2 | 7/2007 | Randall et al. |
| 7,395,959 B2 | 7/2008 | Kirkland et al. |
| 7,426,268 B2 * | 9/2008 | Walker et al. ............ 379/266.01 |
| 7,542,902 B2 | 6/2009 | Scahill et al. |
| 7,606,856 B2 * | 10/2009 | Singh et al. ................... 709/202 |
| 7,653,191 B1 | 1/2010 | Glasser et al. |
| 7,921,369 B2 | 4/2011 | Bill |
| 7,979,279 B1 * | 7/2011 | McKinney .................... 704/251 |
| 8,036,361 B2 | 10/2011 | Batni et al. |
| 8,239,454 B2 * | 8/2012 | Palermo ....................... 709/204 |
| 8,290,136 B2 * | 10/2012 | Dreher et al. ............ 379/202.01 |
| 2002/0003867 A1 | 1/2002 | Rothschild et al. |
| 2002/0194002 A1 | 12/2002 | Petrushin |
| 2005/0021331 A1 * | 1/2005 | Huang et al. .................. 704/231 |
| 2006/0067497 A1 | 3/2006 | Erhart et al. |
| 2007/0047726 A1 | 3/2007 | Jabbour et al. |

(Continued)

OTHER PUBLICATIONS

Lugano, "Mobile Social Networking in Theory and Practice," First Monday, Nov. 3, 2008, vol. 13, No. 11, <http://firstmonday.org/htbin/cgiwrap/bin/ojs/index.php/fm/article/view/2232/2050>.

(Continued)

*Primary Examiner* — William Deane, Jr.
(74) *Attorney, Agent, or Firm* — Withrow & Terranova, PLLC

(57) ABSTRACT

A system and method for merging a first voice call and a second voice call. A first topic discussed during the first voice call is compared to a second topic discussed during the second voice call. If the first topic matches the second topic, the first voice call may be merged with the second voice call. A semantic analysis may be performed on the first topic and the second topic to determine if the first topic and the second topic match one another. Filter criteria may be defined by participants of the first voice call and the second voice call that identify criteria that may preclude merger of the first voice call and the second voice call.

20 Claims, 7 Drawing Sheets

(56) References Cited

U.S. PATENT DOCUMENTS

| | | | |
|---|---|---|---|
| 2007/0071187 | A1 | 3/2007 | Apreutesei et al. |
| 2007/0116227 | A1 | 5/2007 | Vitenson et al. |
| 2007/0255791 | A1* | 11/2007 | Bodlaender et al. .......... 709/206 |
| 2007/0274492 | A1 | 11/2007 | Baker et al. |
| 2008/0114737 | A1 | 5/2008 | Neely et al. |
| 2008/0189407 | A1 | 8/2008 | Charlton et al. |
| 2008/0235018 | A1 | 9/2008 | Eggen et al. |
| 2008/0275701 | A1 | 11/2008 | Wu et al. |
| 2009/0029674 | A1 | 1/2009 | Brezina et al. |
| 2009/0109961 | A1* | 4/2009 | Garrison et al. .............. 370/352 |
| 2009/0112985 | A1 | 4/2009 | Quinn et al. |
| 2009/0164912 | A1* | 6/2009 | Barber et al. ................. 715/751 |
| 2009/0203389 | A1 | 8/2009 | Bhat |
| 2009/0225971 | A1 | 9/2009 | Miller et al. |
| 2009/0292526 | A1* | 11/2009 | Harari et al. ....................... 704/9 |
| 2010/0061539 | A1* | 3/2010 | Cloran et al. ............. 379/202.01 |
| 2010/0169435 | A1 | 7/2010 | O'Sullivan et al. |
| 2010/0205541 | A1* | 8/2010 | Rapaport et al. .............. 715/753 |
| 2010/0280835 | A1* | 11/2010 | Issa et al. ........................ 705/1.1 |
| 2010/0329437 | A1* | 12/2010 | Jeffs et al. ................ 379/112.06 |
| 2011/0075830 | A1* | 3/2011 | Dreher et al. ............. 379/202.01 |
| 2011/0142221 | A1 | 6/2011 | Tofighbakhsh et al. |
| 2012/0284349 | A1* | 11/2012 | Robinson et al. ............. 709/206 |

OTHER PUBLICATIONS

Notice of Allowance for U.S. Appl. No. 13/053,868 mailed Jun. 22, 2012, 10 pages.

Final Office Action for U.S. Appl. No. 13/053,868 mailed Apr. 5, 2012, 37 pages.

* cited by examiner

SYSTEM AND METHOD FOR MERGING VOICE CALLS BASED ON TOPICS

FIELD OF THE INVENTION

The present invention relates generally to merging voice calls, and in particular to merging two voice calls upon determining that topics being discussed in the voice calls match.

BACKGROUND OF THE INVENTION

Participants of a voice call who discuss a particular topic may be interested in discussing the topic with other individuals who have similar interests. Because the relevancy, or interest, in a particular topic may be relatively fleeting during a conversation, the logistical difficulty of locating and joining another individual to a voice call who the participants know have similar interests is frequently not worth the effort. Moreover, even if the effort is undertaken, the individual being joined to the voice call may not have a current interest in discussing the topic, irrespective of a general interest in the topic by the individual.

In some situations people may be interested in joining other individuals to a voice call who share similar interests even if the participants of the voice call do not personally know the other individuals. For example, in a social context, inviting people to talk about topics in which they have a common interest may be a prelude to making new friends. In other contexts the participants of the voice call may just be interested in learning more about a topic from someone with superior knowledge of the topic, irrespective of their personal relationship with the individual.

Accordingly, there is a need for a mechanism that can determine whether participants of two separate voice calls are discussing the same or similar topics, and if so, that can easily enable the participants to merge the two voice calls into a single voice call to allow all of the participants to discuss the topic together.

SUMMARY OF THE INVENTION

The present invention relates to tracking topics discussed in separate voice calls that are, at least in part, occurring concurrently and, upon detecting that topics being discussed in the separate voice calls match, merging the separate voice calls into a single voice call.

According to one embodiment of the invention, first and second participants engage in a first voice call. A first topic being discussed in the first voice call is provided to a conversation merging module, which compares the first topic to topics being discussed in other voice calls that are occurring, at least in part, concurrently with the first voice call. If the first topic matches a topic being discussed in a second voice call, the first voice call and the second voice call may be merged into a single voice call.

The conversation merging module may determine that the first topic matches the second topic based on an exact topic match or based on a determination that the first topic is related to the second topic. For example, a semantic analysis may be performed on the first topic and the second topic to determine whether the first topic and the second topic are semantically related. If so, the conversation merging module may determine that the first topic matches the second topic.

A participant may define filter criteria identifying one or more criteria which the conversation merging module may use to determine whether or not the first voice call and the second voice call may be merged. For example, a participant may define device location criteria identifying one or more locations which, if the participant is participating in a voice call at the identified locations, indicate that the participant does or does not desire to merge the voice call with another voice call. For example, the device location criteria may identify a work location. The conversation merging module may determine that the participant is discussing a topic that matches a topic being discussed in a second voice call, and may then obtain the device location criteria associated with the participant. The conversation merging module may determine that the participant is at the work location and, therefore, determine that the participant does not desire to merge the first voice call with the second voice call.

Filter criteria may comprise contextual criteria, such as device location or time of day, or may comprise call-related criteria, such as the topic being discussed, the identity of the participants of the voice call, and the like. Each of the participants of the first voice call and the second voice call may define filter criteria, and the conversation merging module may obtain the filter criteria associated with each participant prior to merging the first voice call with the second voice call.

The conversation merging module may store a plurality of topics associated with each voice call. Each of the plurality of topics may have a corresponding timestamp identifying a time during which the topic was being discussed during the respective voice call. The timestamp may be used as part of the determination whether the first topic matches the second topic. For example, the conversation merging module may determine that the first topic matches a second topic even though the second topic is not a current topic in the second voice call if the timestamp corresponding to the second topic indicates that the second topic was being discussed in the second voice call within a predetermined time frame. For example, the conversation merging module may determine a match exists if the second topic was being discussed within the past ten minutes in the second voice call.

Upon determining that a match exists, the conversation merging module may send an approval request message to the participants of the first voice call. The approval request message may identify the topic being discussed in the second voice call. The approval request message may also identify the participants of the second voice call. If the participants of the first voice call approve the approval request message, approval authorizations may be sent to the conversation merging module. The conversation merging module then sends an approval request message to the participants of the second voice call. The approval request message may indicate that the participants of the first voice call have authorized the merging of the first voice call and the second voice call.

If the participants of the second voice call approve the approval request message, the conversation merging module may effect the merger of the first voice call and the second voice call. For example, the conversation merging module may signal a network element anchoring the first voice call and the second voice call to merge the first voice call and the second voice call.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
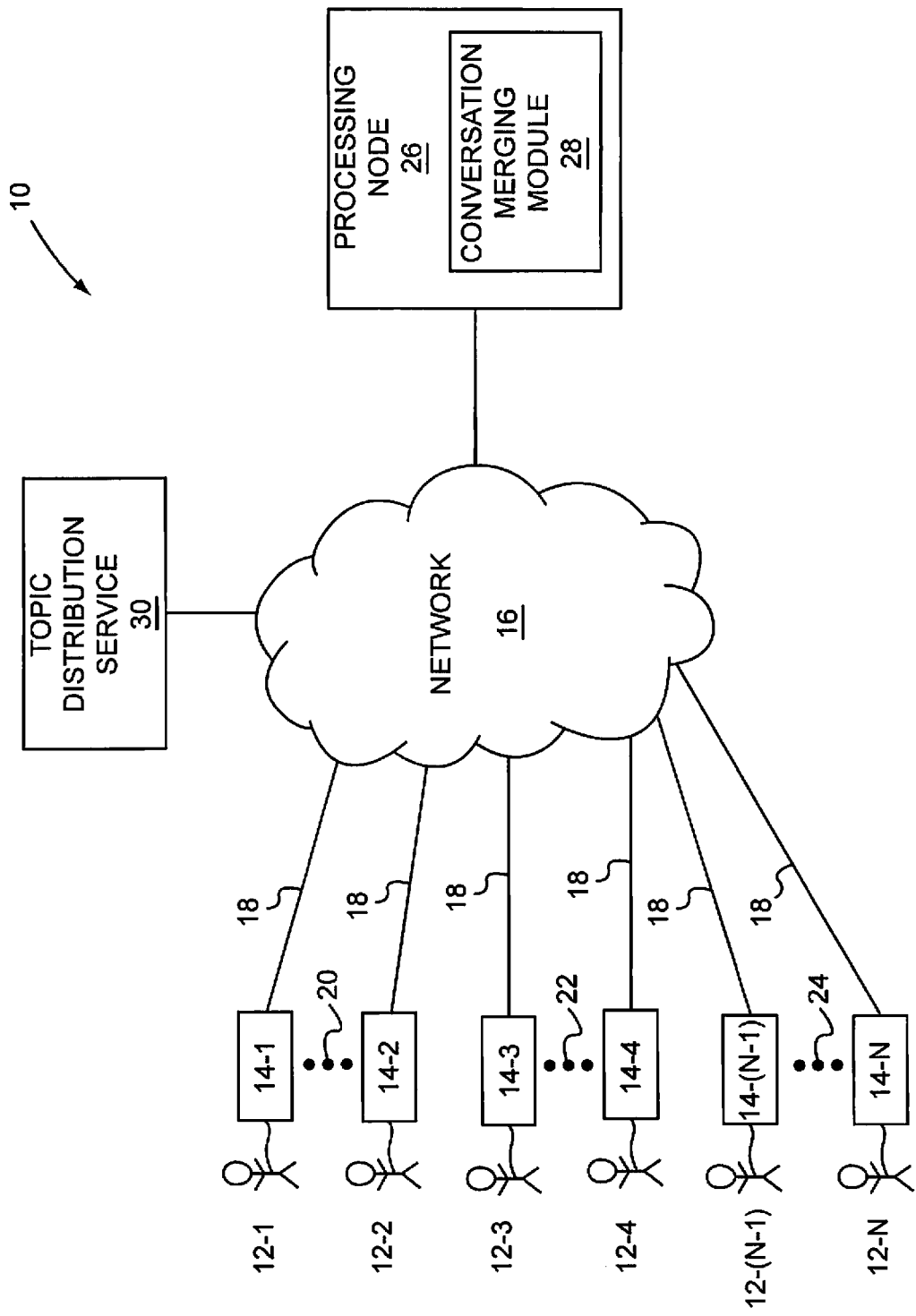
FIG. 1 is a block diagram illustrating an exemplary system in which embodiments of the present invention may be practiced.

FIG. 1 illustrates a system 10 in which aspects of the present invention may be practiced. Participants 12-1 through 12-N (generally referred to herein as a participant 12 or the participants 12) engage in voice calls using corresponding communication devices 14-1 through 14-N (generally referred to herein as a communication device 14 or the communication devices 14). The phrase "voice call" as used herein means a real-time communication session of a finite duration, such as a telephone call, a voice over internet protocol (VoIP) call, a video call, and the like, between at least two participants 12. The communication devices 14 can comprise any suitable fixed or mobile processing device capable of engaging in voice calls including, for example, a Personal Digital Assistant (PDA), a mobile phone such as a cellular phone, a laptop computer, a desktop computer, and the like. Each of the communication devices 14 is coupled to a network 16 via a corresponding access link 18. The access links 18 may comprise a wired or wireless communications link such as WiFi, cellular technology, Ethernet, and the like.

Participants 12, such as the participants 12-1 and 12-2, may establish a voice call between themselves by initiating a communication session 20 between the communication devices 14-1 and 14-2. The communication session 20 may be established using any suitable protocol or protocols including, for example, Session Initiation Protocol (SIP), Media Gateway Control Protocol (MGCP), standard cellular and public switched telephone network (PSTN) signaling mechanisms, and the like, depending on the type of communication device 14. The communication session 20 is typically facilitated by one or more network elements that reside in the network 16, such as, for example, a server, a switch, a router, and the like.

Other separate voice calls may be occurring, at least in part, concurrently with the voice call between the participants 12-1 and 12-2. For example, the participants 12-3 and 12-4 may be involved in a voice call via a communication session 22, and the participants 12-N and 12-(N-1) may be involved in a voice call via a communication session 24. Each of the voice calls include conversations between the respective participants 12.

A processing node 26 communicatively coupled to the network 16 includes a conversation merging module 28. As discussed in greater detail herein, the conversation merging module 28 receives topics discussed during voice calls between participants 12. If the conversation merging module 28 determinates that topics discussed in separate voice calls are sufficiently similar to one another, the conversation merging module 28 may provide the participants 12 who are participating in the voice calls the option to merge the voice calls.

Participants 12 may indicate a desire that a particular voice call be eligible for conversation merging via a registration process. Registration may be managed by the conversation merging module 28. In one embodiment, registration may include a one-time configuration process wherein a participant 12 identifies a particular communication device 14 to the conversation merging module 28. For example, the participant 12-1 may identify the communication device 14-1 by telephone number, media access control (MAC) address, SIP address, or the like, which suitably identifies the communication device 14-1 to the conversation merging module 28. The participant 12-1 may also define one or more criteria that may be used by the conversation merging module 28 to automatically determine whether any particular voice call conducted via the communication device 14-1 is eligible for conversation merging. For example, the participant 12-1 may define criteria which indicates eligibility for conversation merging only during certain days, only at certain times of a day, only when at certain locations, only with certain participants 12 or types of participants 12 (e.g., friends, co-workers), and the like, and any combination thereof.

The conversation merging module 28 may receive notification via the network 16 of the initiation of the communication session 20 and, based on the criteria associated with the participant 12-1, immediately begin processing topics as described in detail herein. Alternately, the conversation merging module 28 may await a separate notification from the communication device 14-1 indicating that the participant 12-1 desires to participate in conversation merging for the respective voice call. The notification may be generated automatically by the communication device 14-1 based on one or more criteria maintained on the communication device 14-1, such as time of day, location of the communication device 14-1, and the like. Alternately, the participant 12-1 may manually initiate a notification via the communication device 14-1 indicating a desire that the voice call be eligible for conversation merging.

The conversation merging module 28 receives notifications of topics being discussed during voice calls between participants 12. In one embodiment, topics may be determined automatically, for example, by a topic distribution service 30. In one embodiment, participants 12 register with the topic distribution service 30, providing the topic distribution service 30 information identifying a respective communication device 14. Once registered, audio streams containing voice signals of the participants 12 are provided to the topic distribution service 30 when the participants 12 engage in voice calls. The participants 12 also provide to the topic distribution service 30 destination information identifying destinations to which the topic distribution service 30 will distribute notifications of topics. The participants 12 may designate the conversation merging module 28 as one such destination.

The topic distribution service 30 detects terms in the voice signals carried in the audio streams that are generated by the participants during a voice call. The topic distribution service 30 may detect terms in the audio streams using, for example, a speech-to-text technology. Topics may then be determined based on the terms with the aid of a semantic analysis, such as with the help of an ontology, via natural language processing, or the like. For example, the topic distribution service 30 may determine a topic of "Star Wars" based on terms such as "Starship Enterprise." The topic distribution service 30 may then generate a topic notification identifying the topic and the participants 12 and distribute the topic notification to one or more destinations, including to the conversation merging module 28. The topic distribution service 30 may also provide filtering functionality, wherein certain topics may result in the generation of topic notifications and others may not based on filtering criteria established by a respective participant 12. While for purposes of illustration the topic distribution service 30 is illustrated separately from the conversation merging module 28, the functionality of the topic distribution service 30 could, in one embodiment, be integral with the conversation merging module 28. In another embodiment the conversation merging module 28 may be integral with a communication device 14.

Assume for example that the participants 12-1 and 12-2 are participating in a first voice call, and both participants 12-1 and 12-2 have indicated to the conversation merging module 28 that the first voice call be eligible for conversation merging. Assume further that the participants 12-3 and 12-4 are participating in a second voice call which is occurring, at least in part, concurrently with the first voice call, and that both participants 12-3 and 12-4 have indicated to the conversation merging module 28 that the second voice call be eligible for conversation merging. Assume that a first topic being discussed in the first voice call is sent to the conversation merging module 28 by the topic distribution service 30. The conversation merging module 28 may store the first topic in storage, such as a hard disk drive or random access memory (RAM), along with a timestamp identifying the time the first topic was received. Assume that a second topic being discussed in the second voice call is also sent to the conversation merging module 28 by the topic distribution service 30. The conversation merging module 28 receives the second topic and determines whether the second topic matches any other topic being discussed in any other active voice call. Assume that the conversation merging module 28 determines that the second topic matches the first topic. As discussed in greater detail herein, the conversation merging module 28 may use semantic analysis or natural language processing, for example, to determine that topics which are not identical may in fact be closely related and therefore constitute a match.

Each of the participants 12-1, 12-2, 12-3, and 12-4 may have defined filter criteria used by the conversation merging module 28 to determine whether the respective participant 12-1, 12-2, 12-3, and 12-4 desires that the first voice call be merged with the second voice call. The defined criteria may include, for example, time of day, location of a respective communication device 14, the particular topic, the identification of the other participants 12, and the like. If the defined criteria of any of the participants 12-1, 12-2, 12-3, and 12-4 indicate that the first voice call should not be merged with the second voice call, the conversation merging module 28 may begin the process anew with the next received topic.

If the defined criteria do not preclude the merger of the first voice call with the second voice call, the conversation merging module 28 may send the participants 12-1 and 12-2 of the first voice call an approval request message requesting approval to merge the first voice call and the second voice call. If the participants 12-1 and 12-2 reply with an approval authorization, the conversation merging module 28 may then send the participants 12-3 and 12-4 of the second voice call an approval request message requesting approval to merge the first voice call and the second voice call. The approval request message may include information associated with the first voice call, such as the identities of the participants 12-1 and 12-2, an identity of one or more topics discussed in the first voice call, an indication that the participants 12-1 and 12-2 have indicated a desire to merge the first voice call with the second voice call, and the like. If the participants 12-3 and 12-4 reply with an approval authorization, the conversation merging module 28 may then effect the merger of the first voice call with the second voice call. The conversation merging module 28 may effect the merger via control requests to one or more network elements in the network 16 responsible for anchoring the communication sessions 20 and 22.

Figure 2:
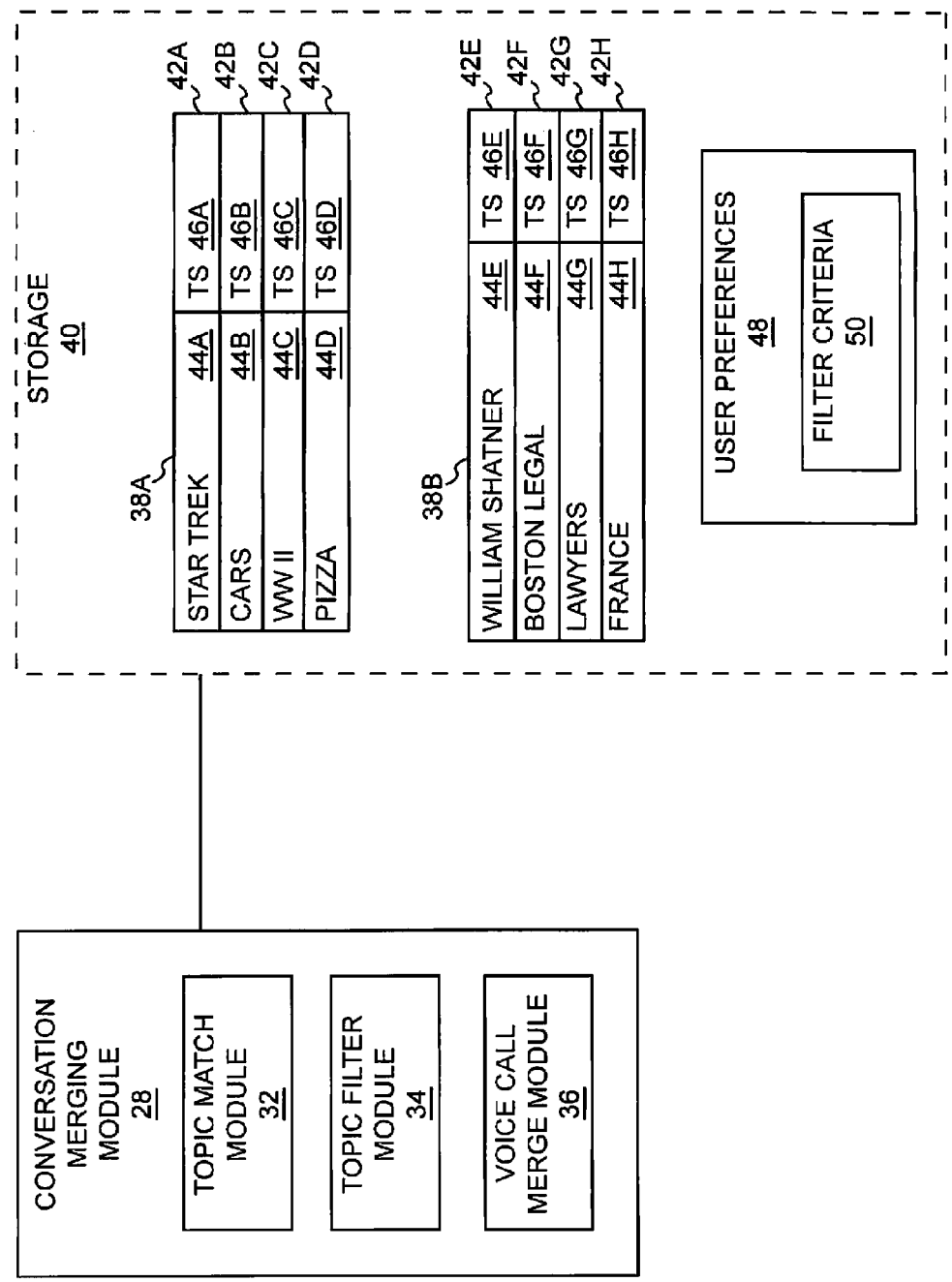
FIG. 2 is a block diagram of an exemplary conversation merging module according to one embodiment of the present invention.

FIG. 2 is a block diagram of an exemplary conversation merging module 28 according to one embodiment of the present invention. The conversation merging module 28 includes a topic match module 32, a topic filter module 34, and a voice call merge module 36. Generally, the topic match module 32 determines whether topics discussed in two separate voice calls which, at least in part, occur concurrently match. The topic filter module 34 determines whether filter criteria defined by any of the participants in two voice calls having matching topics precludes a merger of the two voice calls. The voice call merge module 36 effects the merger of two separate voice calls into a single voice call.

Figure 3:
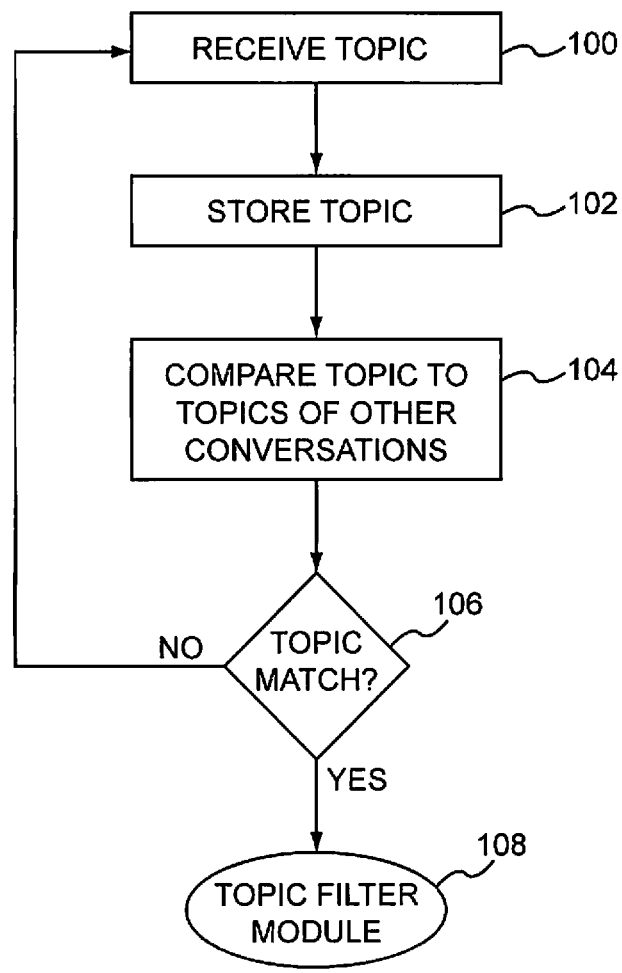
FIG. 3 is a flowchart illustrating exemplary steps for matching topics discussed in two separate voice calls according to one embodiment of the present invention.

FIG. 3 is a flowchart illustrating exemplary steps for matching topics discussed in two separate voice calls according to one embodiment of the present invention. FIG. 3 will be discussed in conjunction with FIGS. 1 and 2. The topic match module 32 receives a topic being discussed in a first voice call between the participants 12-1 and 12-2 (step 100). As discussed previously, the topic may be provided by a service, such as the topic distribution service 30, to the conversation merging module 28. Alternately, the conversation merging module 28 may be coupled to the communication session 20 and receive audio streams generated by the participants 12-1 and 12-2. The conversation merging module 28 may convert the audio streams to text, extract terms from the text, and identify topics based on the terms.

The topic match module 32 may store the topic in a first topic table 38A (FIG. 2) maintained in storage 40 (step 102). The first topic table 38A may include a plurality of topic records 42A through 42D (generally referred to herein as a topic record 42). Each of the topic records 42A through 42D includes a corresponding topic 44A through 44D and corresponding topic timestamp 46A through 46D. For each topic 44 received by the topic match module 32, a topic record 42 is generated containing the topic 44 and a timestamp 46, and the topic record 42 is stored in a topic table 38 corresponding to the particular voice call. Assume that the topic records 42A through 42D are maintained in the first topic table 38A in a chronological order based on the timestamps 46, wherein the topic 44A was received more recently than the topic 44B. The first topic table 38A thus provides a data structure for tracking the topics 44 discussed during the first voice call, and the time when such topics 44 were discussed.

The topic match module 32 may then compare the topic 44A with topics 44 being discussed in other voice calls, such as a second voice call between the participants 12-3 and 12-4 (step 104). Assume topics 44 being discussed in the second voice call are maintained in a second topic table 38B. The second topic table 38B includes a plurality of topic records 42E through 42H identifying topics 44E through 44H which are, or were, discussed during the second voice call. The second topic table 38B also includes a plurality of topic timestamps 46E through 46H which correspond to the topics 44E through 44H. Assume that the topic 44E is the most recent topic 44 received by the topic match module 32 from the topic distribution service 30. The topic match module 32 may determine that the topic 44A matches the topic 44E. Generally, the topic match module 32 may determine that two topics 44 match one another, even though the respective topics 44 are not identical. In another embodiment, the topic match module 32 may require an exact match between topics 44, and only determine that two topics 44 match one another if the two topics 44 are identical.

The topic match module 32 may use any desired matching process to determine whether the topics 44A and 44E match one another. For example, the topic match module 32 may perform a semantic analysis on the topic 44A and the topic 44E to determine if the topic 44A and the topic 44E are sufficiently related to each other to constitute a match. The semantic analysis may include the use of an ontology which identifies a nodal distance between topics 44. For example, an ontology may indicate that the nodal distance between the topic "Star Trek" (topic 44A) is two nodes from the topic "William Shatner" (topic 44E). The topic match module 32 may determine that any topics 44 that are within three nodes of one another constitute a match. If the topic match module 32 determines that the topic 44A does not match the topic 44E, the topic match module 32 may determine whether other topics 44, such as the topics 44F through 44H, match the topic 44A. The topic match module 32 may further require that the topics 44F through 44H have been discussed in the second voice call within a predetermined timeframe, such as within the previous ten minutes, to be considered a match with the topic 44A. The topic match module 32 may use the topic timestamps 46F through 46H to determine if the corresponding topics 44F through 44H were discussed within the predetermined timeframe.

The various parameters described herein, such as a particular nodal distance between two topics 44 in an ontology that defines whether the two topics 44 match one another, whether or not a match may occur based on a previously discussed topic 44 and, if so, the predetermined timeframe within which the topic 44 must have been discussed, may be system configurable or user configurable. For example, each of the participants 12 may, during the initial configuration process, identify such parameters to the conversation merging module 28. The conversation merging module 28 may maintain such parameters in a user preferences 48 (FIG. 2). When determining a match between the topics 44A and 44E, the topic match module 32 may obtain the parameters from the user preferences 48 for each of the participants 12-1 through 12-4. The topic match module 32 may use the most restrictive of such parameters to determine whether the topic 44A matches the topic 44E. Alternately, an administrator of the conversation merging module 28 may define such parameters to apply globally to all topic matches.

If the topic match module 32 determines that the topic 44A matches the topic 44E (step 106), processing may then be performed by the topic filter module 34 to determine whether filter criteria defined by any of the participants 12-1 through 12-4 identify criteria that preclude the merger of the first voice call and the second voice call (step 108). If the topic match module 32 determines that the topic 44A does not match the topic 44E (step 106), the topic match module 32 returns to step 100 to receive the next topic discussed in a voice call.

Figure 4:
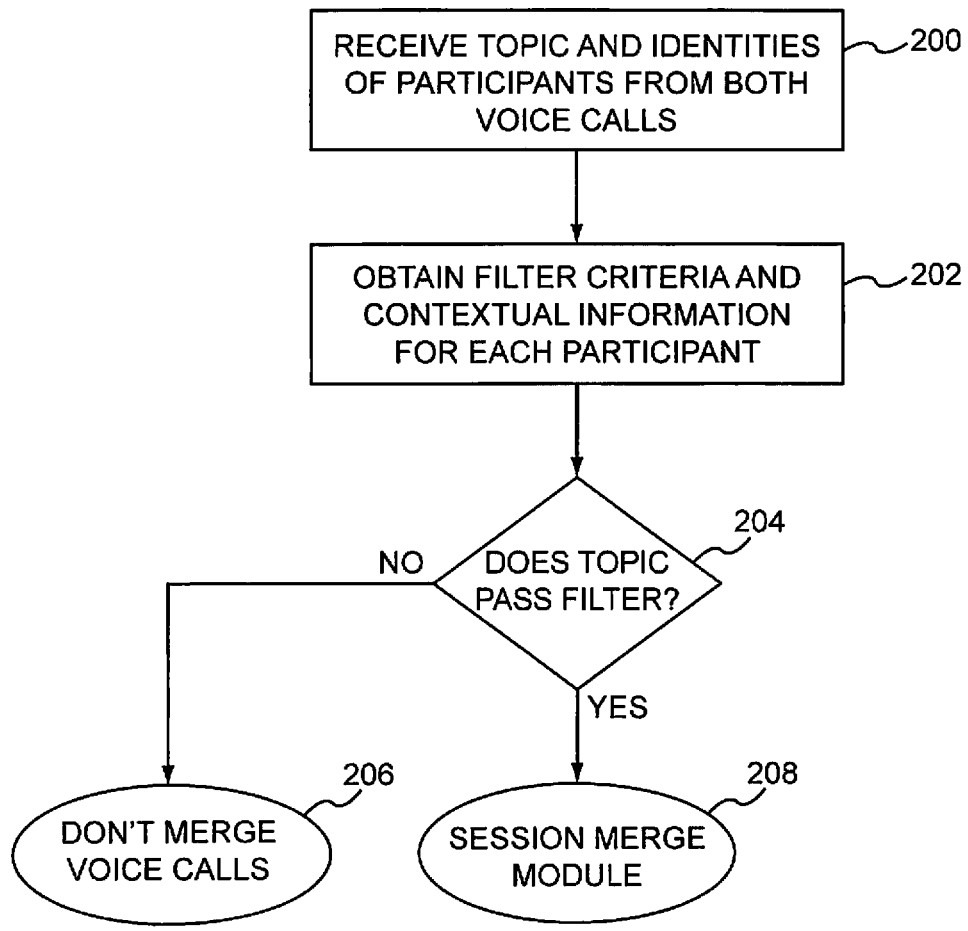
FIG. 4 is a flowchart illustrating exemplary steps for applying filter criteria to two voice calls to determine whether the voice calls may be merged.

FIG. 4 is a flowchart illustrating exemplary steps for applying filter criteria to a first voice call and a second voice call to determine whether the first voice call and the second voice call are eligible to be merged. FIG. 4 will be discussed in conjunction with FIGS. 1 and 2. Assume, as discussed with regard to FIG. 3, that the topic match module 32 determines that the topic 44A matches the topic 44E. The topic filter module 34 receives, or otherwise obtains, the topics 44A and 44E and the identities of the participants 12-1 through 12-4 (step 200). Filter criteria 50 (FIG. 2) defined by each of the participants 12-1 through 12-4 may be maintained in the storage 40. The filter criteria 50 for each of the participants 12-1 through 12-4 may be obtained from the storage 40 by the topic filter module 34 (step 202).

The filter criteria 50 may comprise any criteria that may define a basis for precluding, or permitting, the merging of the first voice call and the second voice call. For example, the filter criteria 50 may identify particular topics 44 for which the respective participant approves or disapproves voice call merger. For example, the filter criteria 50 associated with the participant 12-1 may identify the topic "wife" as a disapproved topic. If the topic 44A is equivalent to the topic "wife," the topic filter module 34 will preclude the merger of the first voice call and the second voice call. Additional filter criteria 50 defined by the participant 12-1 may include a location of a communication device 14-1, a time of day, and whether or not the participants 12-3 and 12-4 are members of a particular social network. The filter criteria 50 may also be based on demographics of the participants 12-3 and 12-4, such as gender, age, and the like. In one embodiment, the topic distribution service 30 may include an emotion recognition module that can identify an emotion of the participants of the second voice call, such as "happy," "sad," "angry," and the like. In such an embodiment, the participant 12-1 may identify permissible or impermissible emotions of the participants 12-3 and 12-4 that dictate whether a voice call merger is permitted or precluded. If the topic distribution service 30 can identify languages and/or accents of the participants 12-3 and 12-4, the participant 12-1 may define filter criteria 50 indicating whether certain languages, or accents, are permissible for a voice call merger, and whether certain languages, or accents, preclude voice call merger.

The filter criteria 50 may include topic duration criteria which identifies a minimum duration of a conversation about a particular topic to qualify for voice call merger. For example, assume that the participant 12-1 has associated filter criteria 50 that includes a topic duration criteria of 15 seconds. Assume further that the topic 44A matches the topic 44E. The topic filter module 34 determines, based on the timestamp 46E that the topic 44E has been discussed in the second voice call for more than 15 seconds. Thus, the topic duration criteria does not preclude voice call merger.

According to one embodiment, the topic filter module 34 may maintain a historical list of topics 44 for which each participant 12 has previously rejected a voice call merger and may determine, based on the historical list, that a particular topic 44 precludes a voice call merger with that respective participant 12.

Next, the topic filter module 34 determines whether the filter criteria 50 corresponding to any of the participants 12-1 through 12-4 preclude the merger of the first voice call and the second voice call (step 204). If so, the topic filter module 34 does not initiate a voice call merger of the first voice call and the second voice call (step 206). If none of the filter criteria 50 preclude a voice call merger, processing continues to the voice call merge module 36 (step 208).

Figure 5:
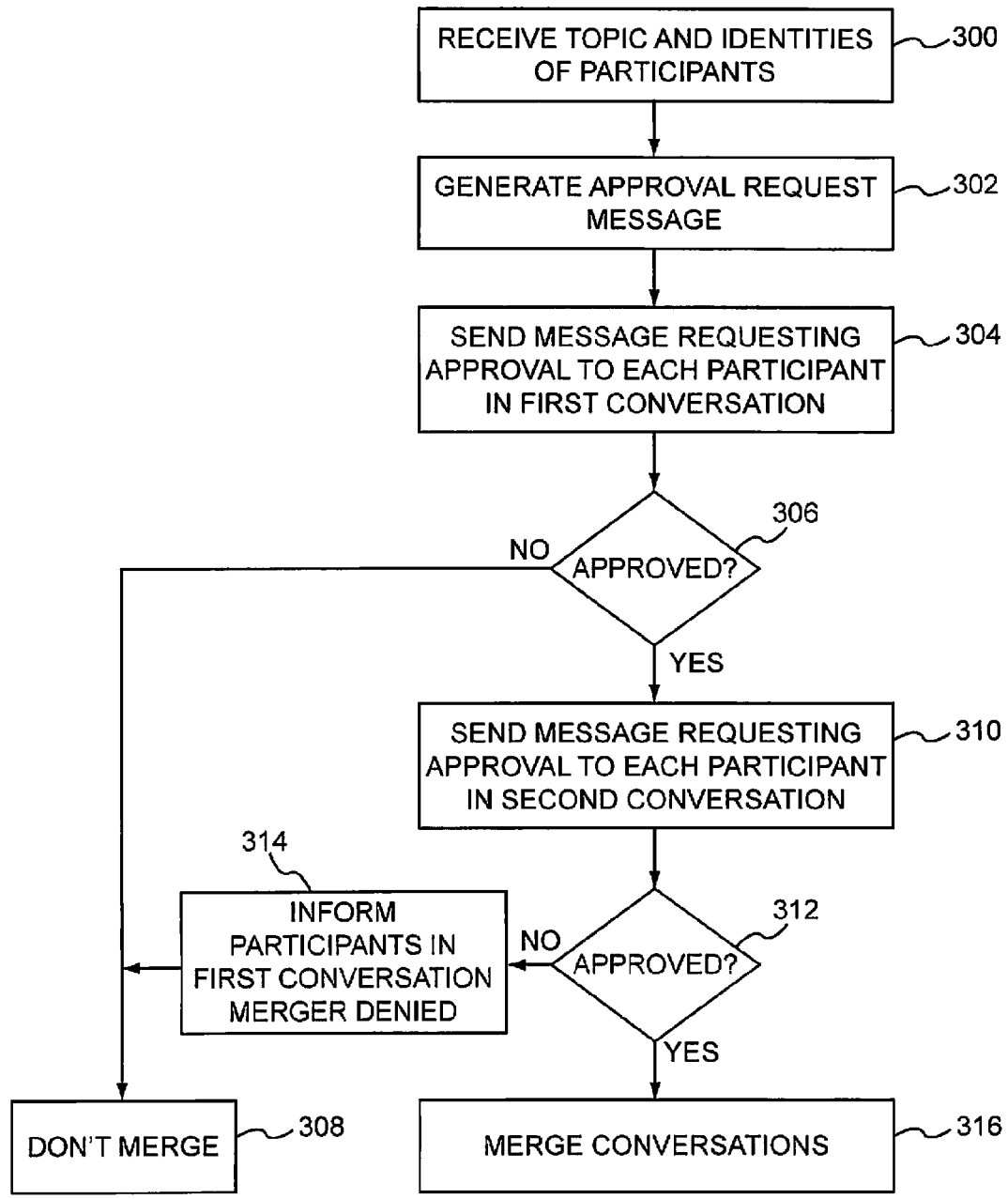
FIG. 5 is a flowchart illustrating exemplary steps for merging a first voice call and a second voice call according to one embodiment of the present invention.

FIG. 5 is a flowchart illustrating exemplary steps for merging a first voice call and a second voice call according to one embodiment of the present invention. FIG. 5 will be discussed in conjunction with FIGS. 1, 2, and 6. The voice call merge module 36 receives the topics 44A and 44E and the identities of the participants 12-1 through 12-4 (step 300). The voice call merge module 36 selects either the first voice call or the second voice call to determine the particular participants 12 to whom to send approval request messages requesting approval to merge the first voice call and the second voice call. Assume that the voice call merge module 36 selects the first voice call. The voice call merge module 36 generates an approval request message (step 302). The voice call merge module 36 sends the approval request message to the participants 12-1 and 12-2 (step 304). The approval request message may comprise any suitable message via which the participants 12-1 and 12-2 may indicate approval to merge the voice calls. For example, if the communication devices 14-1 and 14-2 are mobile telephones, the approval request message may comprise a Short Message Service (SMS) message directed to the communication devices 14-1 and 14-2. If the communication devices 14-1 and 14-2 are computers, the approval request message may comprise an instant message or an email message.

Figure 6:
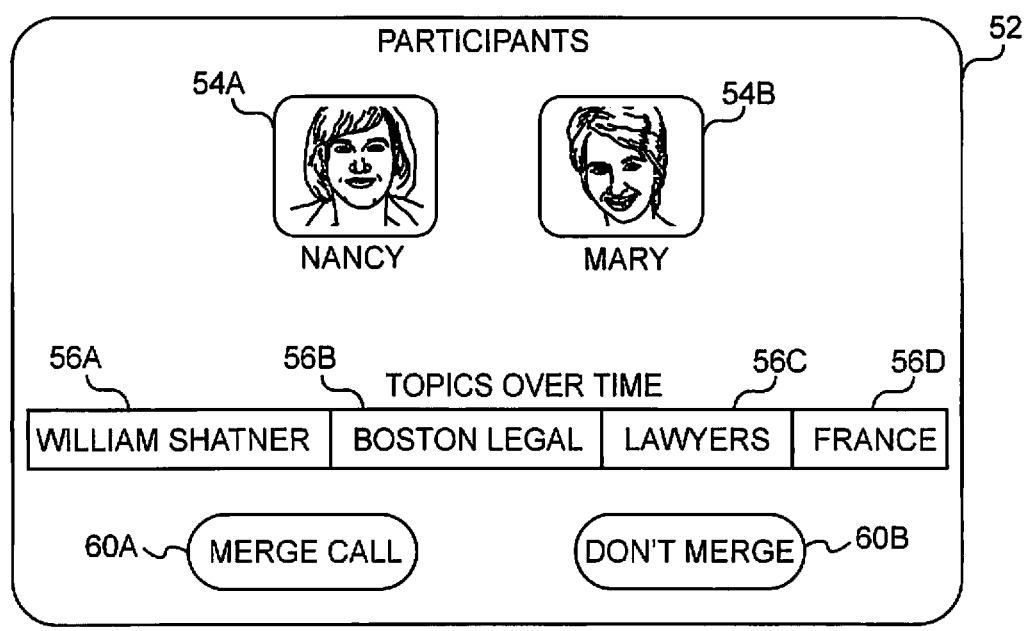
FIG. 6 is an exemplary approval request message according to one embodiment of the present invention.

The approval request message may simply request approval to merge the first voice call and the second voice call, or may include additional information such as the identity of the participants 12-3 and 12-4, topics 44 discussed in the second voice call, and the like. FIG. 6 is an exemplary approval request message according to one embodiment of the present invention. A message box 52 includes participant identifiers 54A and 54B identifying the participants 12-3 and 12-4, respectively. The message box 52 may also include topic identifier regions 56A through 56D identifying the topics 44E through 44H (FIG. 2) discussed during the second voice call. A selection button 60A may be used by the participants 12-1 and 12-2, respectively, to indicate approval for merging the first voice call and the second voice call. If, for example, the participant 12-1 selects the selection button 60A, the communication device 14-1 will generate and send an authorization approval indicating approval by the participant 12-1 to merge the first voice call and the second voice call to the voice call merge module 36. A selection button 60B may be used to disapprove merging the first voice call and the second voice call.

Referring again to FIG. 5, if either of the participants 12-1 and 12-2 decline to approve the merger of the first voice call and the second voice call (step 306), then the voice call merge module 36 terminates the process and does not merge the voice calls (step 308). If both of the participants 12-1 and 12-2 indicate approval to merge the first voice call and the second voice call, the voice call merge module 36 generates and sends an approval request message to the participants 12-3 and 12-4 (step 310). The approval request message may identify the participants 12-1 and 12-2 and topics 44 discussed during the first voice call. The approval request message may also indicate that the participants 12-1 and 12-2 have approved the merger of the first voice call and the second voice call. If either of the participants 12-3 and 12-4 disapprove merging the first voice call and the second voice call (step 312), the voice call merge module 36 may generate and send a notification message to the participants 12-1 and 12-2 indicating that the merger of the first voice call and second voice call has been denied (step 314). The voice call merge module 36 then terminates the process (step 308). If both of the participants 12-3 and 12-4 approve merging the first voice call and the second voice call (step 312), the voice call merge module 36 can effect the merger of the first voice call and the second voice call (step 316). In alternate embodiments, voice call merger may be approved using any of various methodologies, such as by voting, wherein each approval of a participant 12 counts as a vote to merge, and each disapproval counts as a vote not to merge. Alternately, a participant 12 may be designated as a "moderator" or a "host" and may solely determine whether voice calls may be merged, or not, irrespective of the desires of the other participants 12.

The voice call merge module 36 may effect the merger of the first voice call and the second voice call in any suitable manner based on the particular communication devices 14-1 through 14-4. For example, the voice call merge module 36 may generate and send to appropriate network elements in the network 16 (FIG. 1) suitable control signals directing the network elements to merge the first voice call and the second voice call. For example, the first voice call and the second voice call may be IP Multimedia System (IMS) voice calls, and may be anchored by one or more IMS network elements in the network 16. The voice call merge module 36 may send the appropriate network elements call control signals, as appropriate, to effect the merging of the first voice call with the second voice call.

Figure 7:
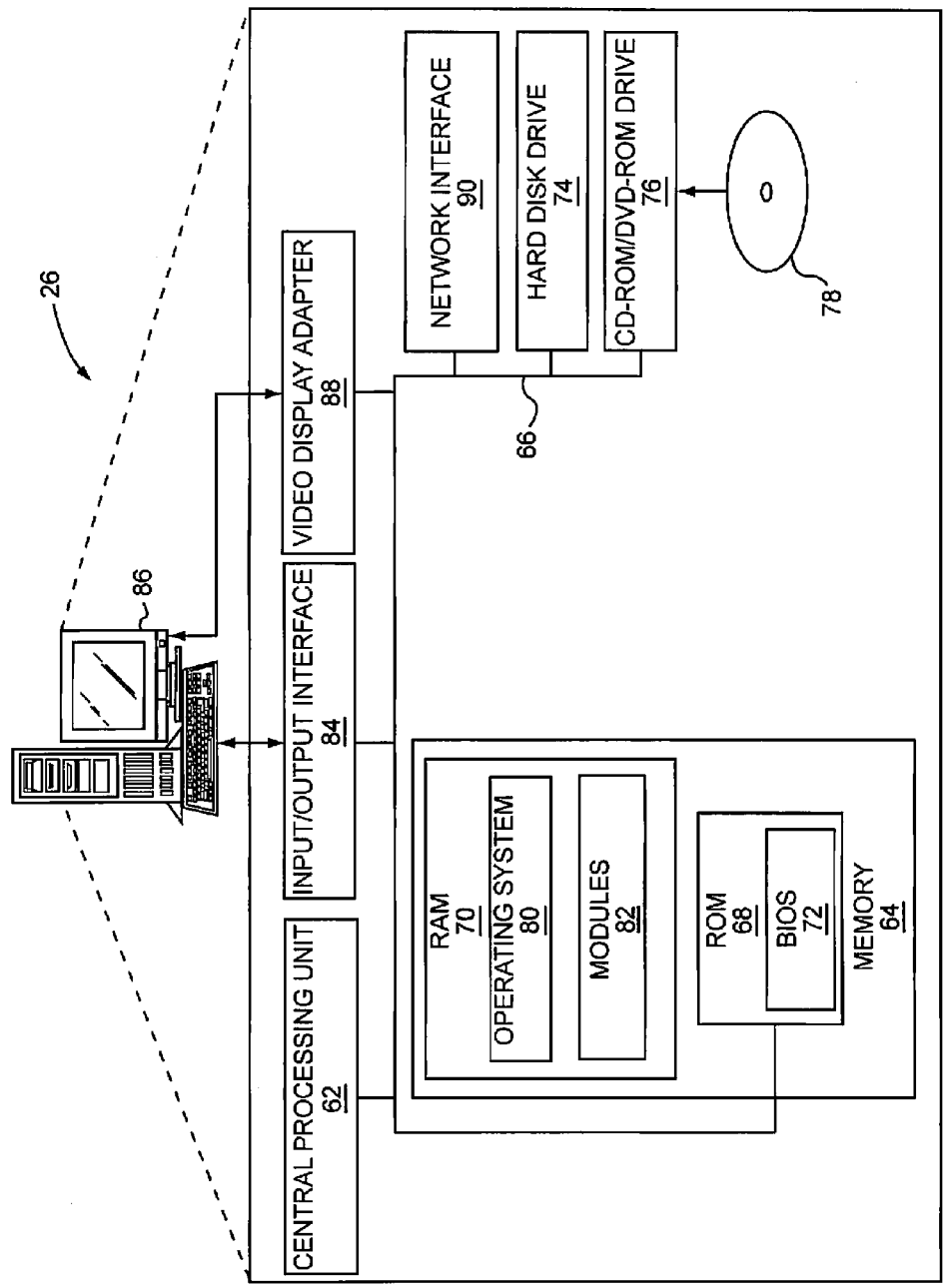
FIG. 7 illustrates an exemplary processing node according to one embodiment of the present invention.

FIG. 7 illustrates an exemplary computing device for implementing the processing node 26 (FIG. 1). The exemplary processing node 26 includes a central processing unit 62, system memory 64, and a system bus 66. The system bus 66 provides an interface for system components including, but not limited to, the system memory 64, to the central processing unit 62. The central processing unit 62 can be any of various commercially available processors. Dual microprocessors and other multi-processor architectures may also be employed as the central processing unit 62.

The system bus 66 can be any of several types of bus structures that may further interconnect to a memory bus (with or without a memory controller), a peripheral bus, and a local bus using any of a variety of commercially available bus architectures. The system memory 64 can include non-volatile memory 68 and/or volatile memory 70 (e.g., RAM). A basic input/output system (BIOS) 72 can be stored in the non-volatile memory 68 (e.g., read only memory (ROM), erasable programmable read only memory (EPROM), electrically erasable programmable read only memory (EEPROM), etc.), which can include the basic routines that help to transfer information between elements within the processing node 26. The volatile memory 70 can also include a high-speed RAM such as static RAM for caching data.

The processing node 26 may further include an internal hard disk drive (HDD) 74 (e.g., enhanced integrated drive electronics (EIDE) or serial advanced technology attachment (SATA)) for storage. The processing node 26 may further include an optical disk drive 76 (e.g., for reading a compact disc read-only memory (CD-ROM) disk 78). The drives and associated computer-readable media provide non-volatile storage of data, data structures, computer-executable instructions, and so forth. For the processing node 26, the drives and media accommodate the storage of any data in a suitable digital format. Although the description of computer-readable media above refers to a HDD and optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, any such media may contain computer-executable instructions for performing novel methods of the disclosed architecture.

A number of program modules can be stored in the drives and volatile memory 70 including an operating system 80; one or more modules 82 including, for example, the conversation merging module 28 and other modules described herein. It is to be appreciated that the invention can be implemented with various commercially available operating systems or combinations of operating systems. All or a portion of the invention may be implemented as a computer program product, such as a computer usable medium having a computer readable program code embodied therein. The computer readable program code can include software instructions for implementing the functionality of the conversation merging module 28 and other aspects of the present invention, as discussed herein. The central processing unit 62 in conjunction with the modules 82 in the volatile memory 70 may serve as a control system for the processing node 26.

A user can enter commands and information into the processing node 26 through one or more wired/wireless input devices, for example, a keyboard and a pointing device, such as a mouse (not illustrated). Other input devices (not illustrated) may include a microphone, an infrared (IR) remote control, a joystick, a game pad, a stylus pen, touch screen, or the like. These and other input devices are often connected to the central processing unit 62 through an input device interface 84 that is coupled to the system bus 66 but can be connected by other interfaces such as a parallel port, an IEEE 1394 serial port, a game port, a universal serial bus (USB) port, an IR interface, etc.

The processing node 26 may include a display 86, which may also be connected to the system bus 66 via an interface, such as a video adapter 88. The display 86 may be separate from or integral with the processing node 26. The processing node 26 may operate in a networked environment using a wired and/or wireless communication network interface 90. The network interface 90 can facilitate wired and/or wireless communications to the network 16 (FIG. 1).

The processing node 26 may be operable to communicate with any wireless devices or entities operatively disposed in wireless communication, for example, a printer, a scanner, a desktop and/or portable computer via wireless technologies, such as Wi-Fi and Bluetooth, for example.

Those skilled in the art will recognize improvements and modifications to the preferred embodiments of the present invention. All such improvements and modifications are considered within the scope of the concepts disclosed herein and the claims that follow.

What is claimed is:

1. A method for merging a first voice call and a second voice call, comprising:
   receiving, by a processing node, a first topic actively being discussed between a first participant and a second participant engaged in the first voice call;
   receiving, by the processing node, a second topic being discussed between a third participant and a fourth participant actively engaged in the second voice call occurring at least in part concurrently with the first voice call;
   determining, by the processing node, if the first topic matches the second topic; and
   if the first topic matches the second topic, merging the first voice call and the second voice call, wherein the first participant, the second participant, the third participant, and the fourth participant can talk with one another.

2. The method of claim 1, further comprising sending an approval request to the first participant and the second participant that requests approval to merge the first voice call and the second voice call, receiving a first approval authorization from the first participant and a second approval authorization from the second participant, and wherein the first voice call and the second voice call are merged after receipt of the first approval authorization and the second approval authorization.

3. The method of claim 2, wherein the approval request identifies the third participant and the fourth participant, and wherein the first, second, third, and fourth participants are different entities.

4. The method of claim 3, wherein the approval request identifies the second topic.

5. The method of claim 3, wherein the approval request identifies a plurality of topics discussed between the third participant and the fourth participant during the second voice call, and wherein the plurality of topics includes the second topic.

6. The method of claim 1, further comprising receiving, over a duration of the second voice call, a plurality of second topics being discussed between the third participant and the fourth participant in the second voice call, and wherein determining if the first topic matches the second topic further comprises determining if the first topic matches any of the plurality of second topics and, if so, merging the first voice call and the second voice call.

7. The method of claim 6, further comprising storing the plurality of second topics and a plurality of timestamps in a storage, wherein each of the plurality of timestamps corresponds to one of the plurality of second topics and identifies a time during the second voice call that the corresponding one of the plurality of second topics was being discussed by the third participant and the fourth participant.

8. The method of claim 1, wherein determining if the first topic matches the second topic comprises performing a semantic analysis on the first topic and the second topic, and if the first topic is semantically related to the second topic, determining that the first topic matches the second topic.

9. The method of claim 1, further comprising obtaining at least one filter criterion associated with the first participant, and merging the first voice call and the second voice call based at least in part on the at least one filter criterion.

10. The method of claim 9, wherein the at least one filter criterion identifies at least one participant, and wherein the at least one participant is one of the third participant and the fourth participant.

11. A computing device comprising:
    a communications interface adapted to communicate with a network; and
    a control system coupled to the communications interface and adapted to:
       receive a first topic actively being discussed between a first participant and a second participant engaged in a first voice call;
       receive a second topic being discussed between a third participant and a fourth participant actively engaged in a second voice call occurring at least in part concurrently with the first voice call;
       determine if the first topic matches the second topic; and
       if the first topic matches the second topic, effect a merger of the first voice call and the second voice call, wherein the first participant, the second participant, the third participant, and the fourth participant can talk with one another.

12. The computing device of claim 11, wherein the control system is further adapted to send an approval request to the first participant and the second participant that requests approval to merge the first voice call and the second voice call, receive a first approval authorization from the first participant and a second approval authorization from the second participant, and wherein the control system effects the merger of the first voice call and the second voice call after receipt of the first approval authorization and the second approval authorization.

13. The computing device of claim 12, wherein the approval request identifies the third participant and the fourth participant, and wherein the first, second, third, and fourth participants are different entities.

14. The computing device of claim 13, wherein the approval request identifies the second topic.

15. The computing device of claim 11, wherein the control system is further adapted to obtain at least one filter criterion associated with the first participant, and merge the first voice call and the second voice call based at least in part on the at least one filter criterion.

16. A non-transitory computer program product, comprising a computer usable medium having a computer readable program code embodied therein, the computer readable program code adapted to be executed to implement a method for merging a first voice call and a second voice call, comprising:

receiving a first topic actively being discussed between a first participant and a second participant engaged in the first voice call;

receiving a second topic being discussed between a third participant and a fourth participant actively engaged in the second voice call occurring at least in part concurrently with the first voice call;

determining if the first topic matches the second topic; and if the first topic matches the second topic, merging the first voice call and the second voice call, wherein the first participant, the second participant, the third participant, and the fourth participant can talk with one another.

17. The computer program product of claim 16, wherein the method further comprises sending an approval request to the first participant and the second participant that requests approval to merge the first voice call and the second voice call, receiving a first approval authorization from the first participant and a second approval authorization from the second participant, and wherein the first voice call and the second voice call are merged after receipt of the first approval authorization and the second approval authorization.

18. The computer program product of claim 17, wherein the approval request identifies the third participant and the fourth participant, wherein the first, second, third, and fourth participants are different entities.

19. The computer program product of claim 18, wherein the approval request identifies the second topic.

20. The computer program product of claim 16, wherein the method further comprises obtaining at least one filter criterion associated with the first participant, and merging the first voice call and the second voice call based at least in part on the at least one filter criterion.

* * * * *